April 25, 1933. E. J. HIRVONEN 1,905,094
HYDRAULIC FEED SYSTEM FOR MACHINE TOOLS
Filed May 31, 1930 9 Sheets-Sheet 5

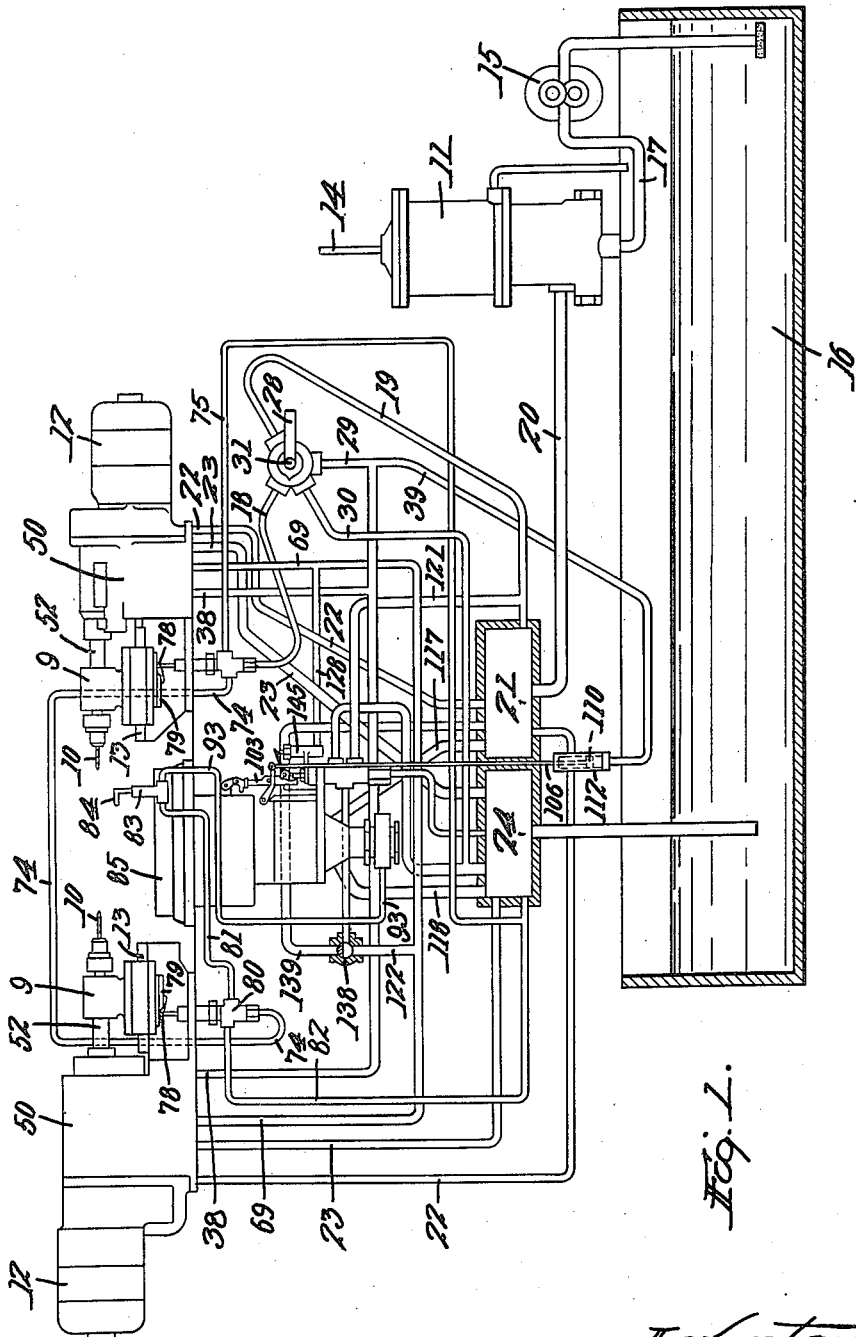

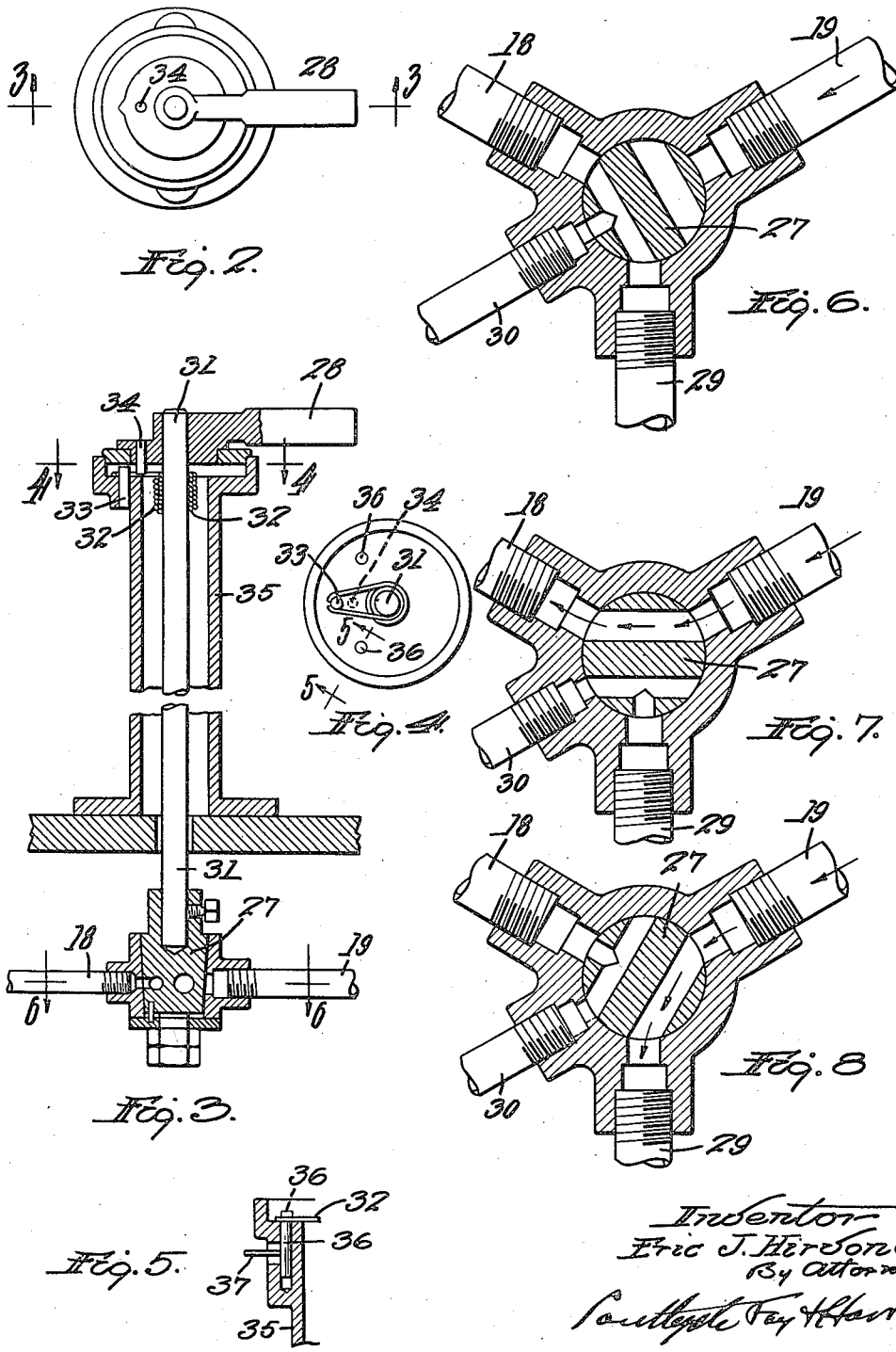

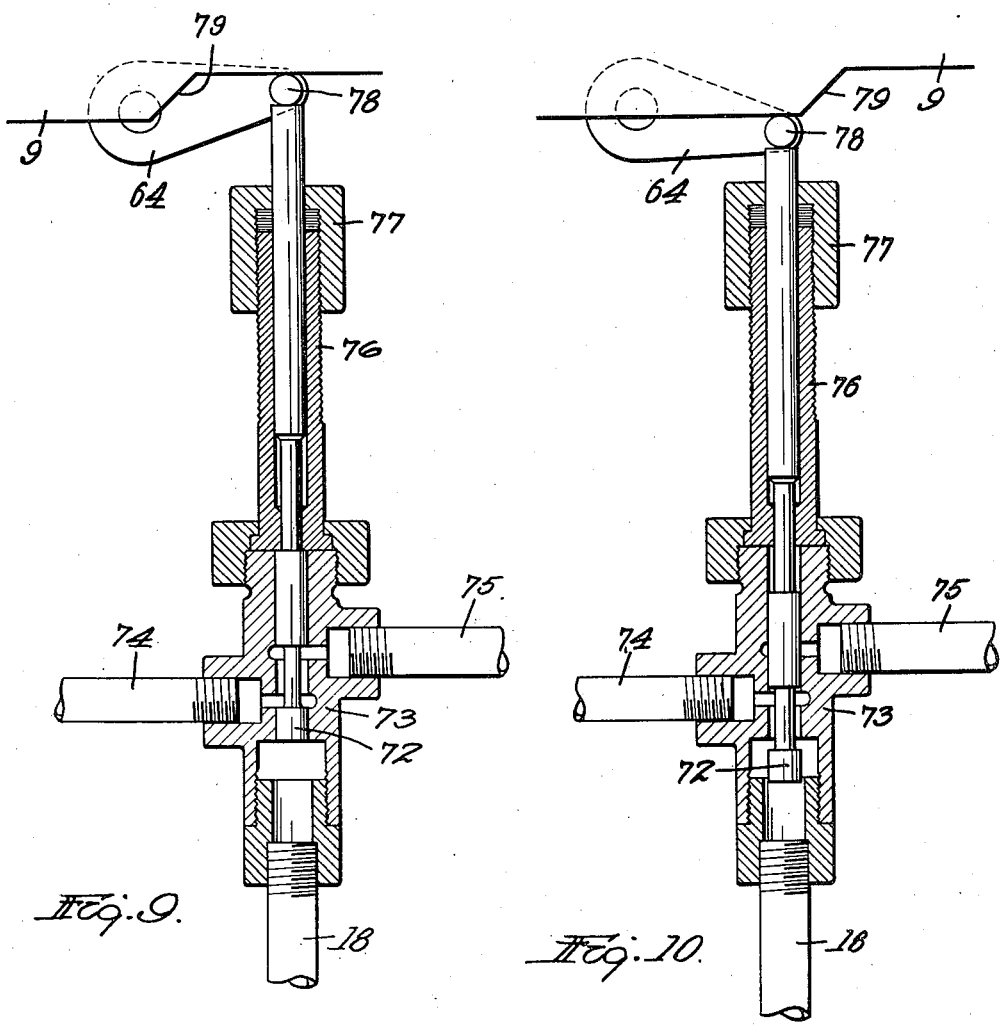

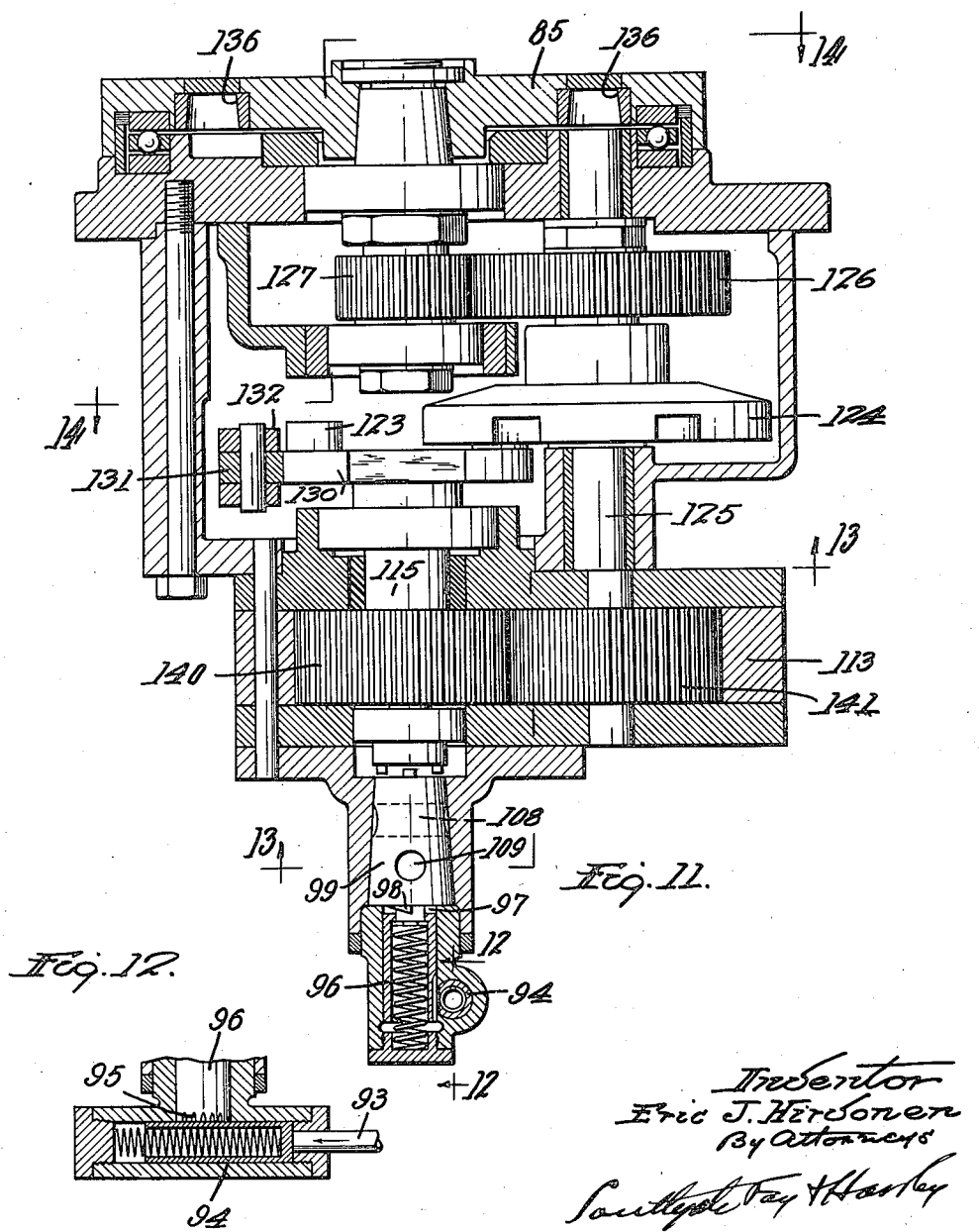

Inventor
Eric J. Hirvonen
By Attorneys

April 25, 1933.  E. J. HIRVONEN  1,905,094
HYDRAULIC FEED SYSTEM FOR MACHINE TOOLS
Filed May 31, 1930  9 Sheets-Sheet 6

Inventor
Eric J. Hirvonen
By Attorneys
Southgate Fay & Hartley

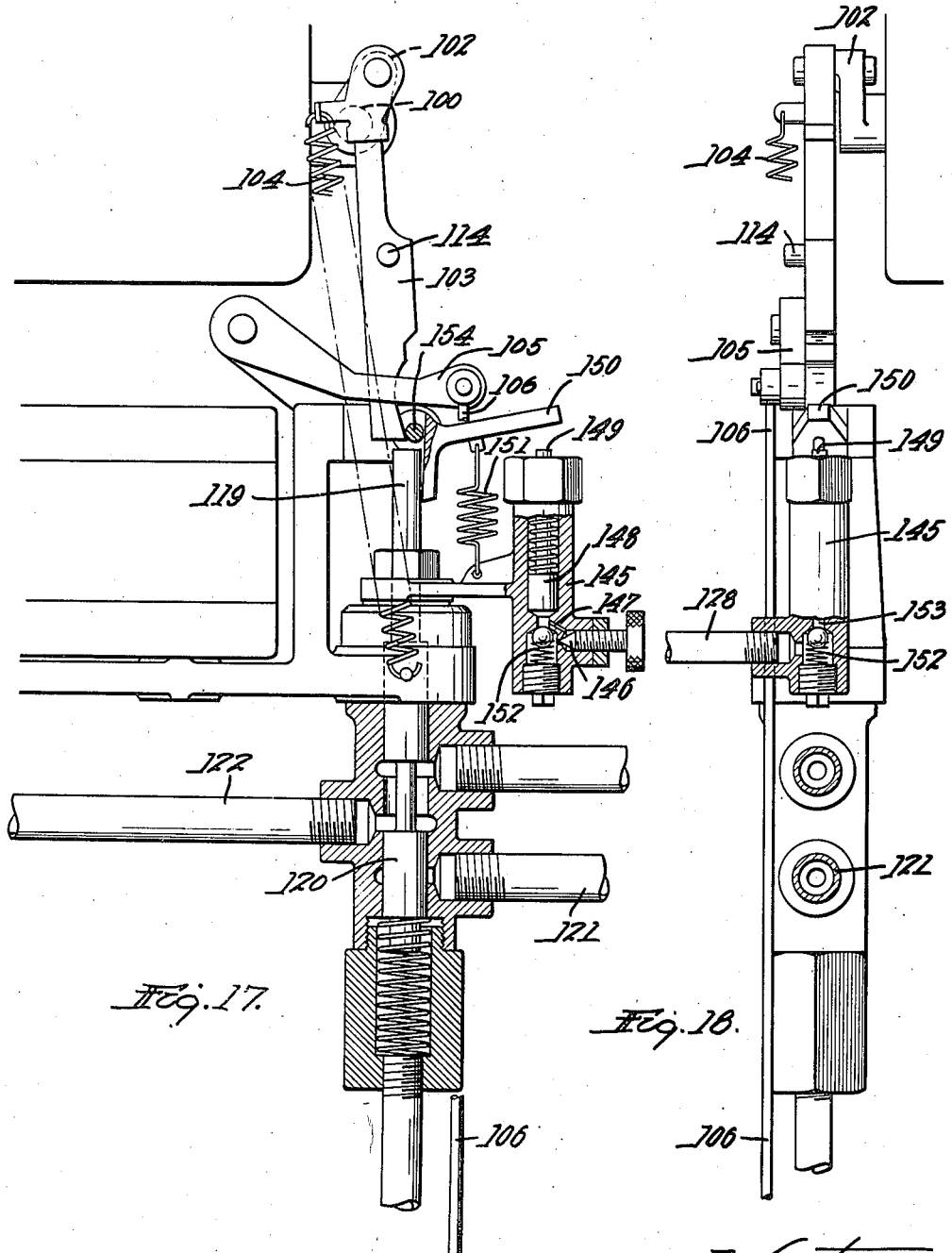

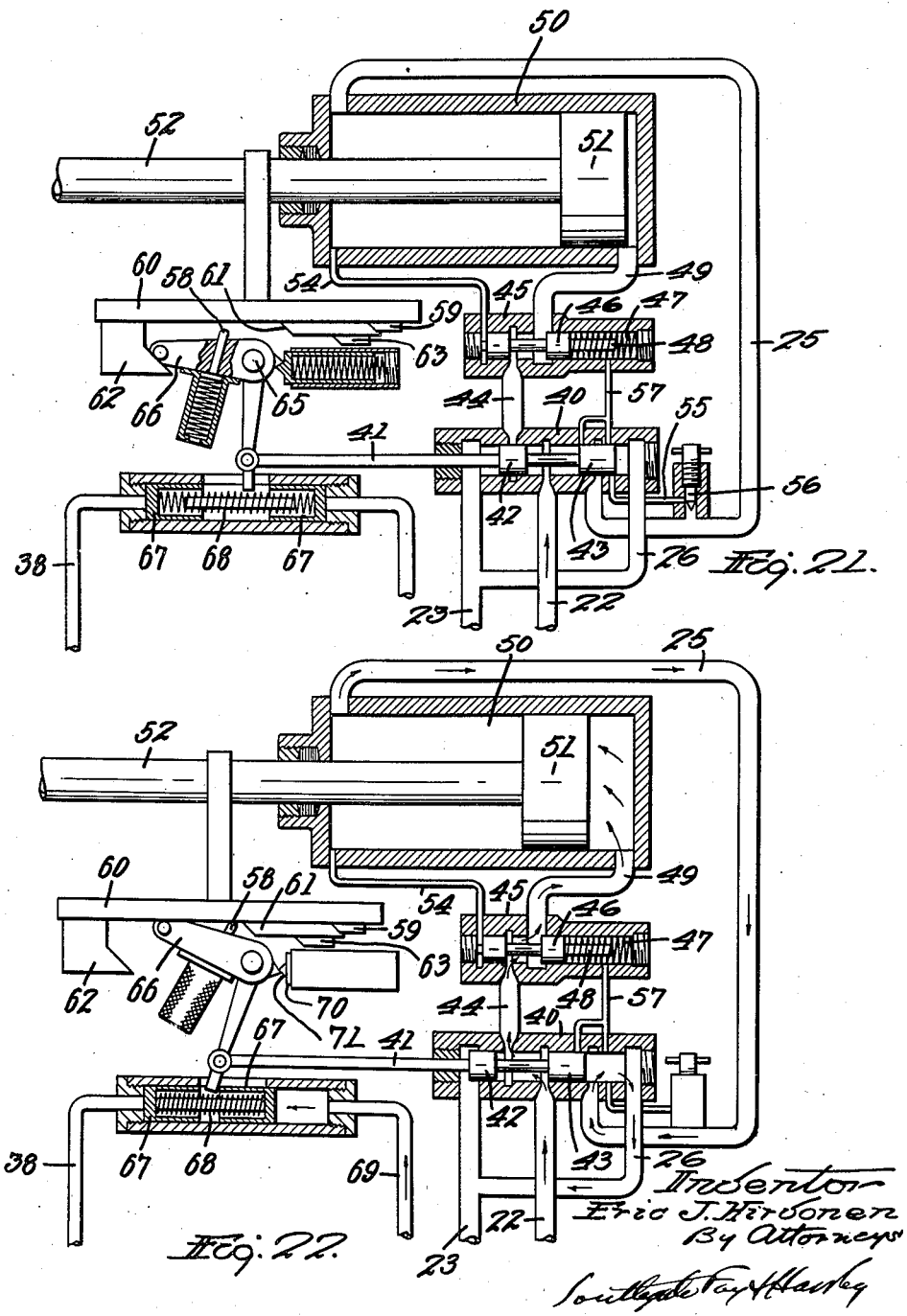

Patented Apr. 25, 1933

1,905,094

UNITED STATES PATENT OFFICE

ERIC J. HIRVONEN, OF WORCESTER, MASSACHUSETTS, ASSIGNOR TO LELAND-GIFFORD COMPANY, A CORPORATION OF MASSACHUSETTS

HYDRAULIC FEED SYSTEM FOR MACHINE TOOLS

Application filed May 31, 1930. Serial No. 457,953.

This invention relates to the feeding of machine tools, including drills, taps and the like, by hydraulic means.

The principal objects of the invention are to provide means by which the source of pressure will always be instantaneously available for the feeding of the tools; to provide means whereby the feed is prevented when, for any reason, any part of the machinery is not in proper position to operate; to provide means whereby the feed is prevented when the work is not properly positioned and centered in the machine; to provide an improved system of control valves and in general to provide a full automatic control capable of application to any desired number of tools, whether of the same or different characters and whether operating in strict unison or out of tune with each other.

Other objects and advantages of the invention will appear hereinafter.

Reference is to be had to the accompanying drawings in which

Fig. 1 is a diagrammatic view of the entire system of piping and connected parts for a drill, arranged in accordance with a preferred embodiment of this invention;

Fig. 2 is a plan of a starting valve constituting a part of the system;

Fig. 3 is a sectional view on the line 3—3 of Fig. 2;

Fig. 4 is a plan of a detail taken below the line 4—4 of Fig. 3;

Fig. 5 is a sectional view on the line 5—5 of Fig. 4;

Fig. 6 is a sectional view through the valve on the line 6—6 of Fig. 3 showing the valve in stopping position;

Fig. 7 is a similar view showing the valve alone but in running position;

Fig. 8 is a similar view showing the valve in reverse position;

Fig. 9 is a central sectional view of a controlling valve arranged to be operated by the movement of one of the drills and shown in an inactive position;

Fig. 10 is a similar view showing the valve open so that the table can operate;

Fig. 11 is a side elevation, with the casing and supporting parts in section, of the indexing mechanism with its valve;

Fig. 12 is a sectional view of the means for operating the valve taken on the line 12—12 of Fig. 11;

Fig. 17 is a similar view showing the parts in inoperative position;

Fig. 18 is an edge view of the same partly in section;

Fig. 21 is a view, somewhat diagrammatic in form showing the means for controlling the operation of the piston for moving one of the tools and showing the parts in neutral position, and Fig. 22 is a similar view showing the parts in a position to move the tool forward.

Figure 13:
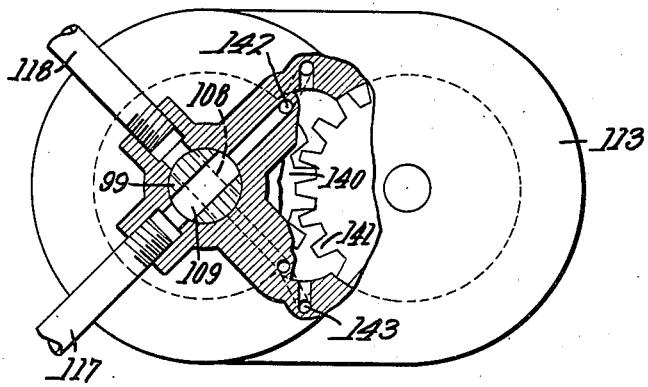
Fig. 13 is a sectional view on the line 13—13 of Fig. 11.
Figure 15:
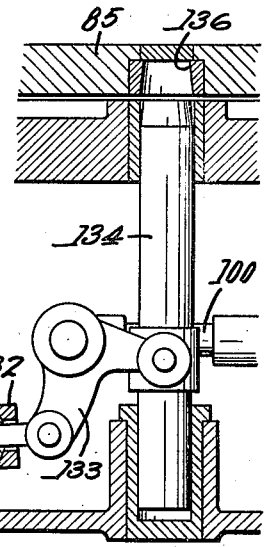
Fig. 15 is a sectional view on the line 15—15 of Fig. 14.

Although this invention is capable of general use for driving various kinds of metal working tools, or even wood working tools for that matter, it is illustrated as applied to a drill in which two drills 10 are shown located in movable heads 9 opposite each other. It is usually applied to machines in which a series of drills are located on each side. The drills are rotated by motors 12. The drill heads 9 are capable of sliding back and forth on guiding supports 13.

This invention is designed to provide means for moving the drill or other tool heads back and forth to perform the drilling operation and withdraw the drill. The oil or water for performing these functions is supplied from a single source to a number of cylinders 50 having pistons 51 operating the drill heads.

As has been set forth in a joint application filed April 23, 1929 by Benjamin S. T.

Bishop and myself, Serial No. 357,532, the drills usually go in together, or approximately together, so that a maximum supply of fluid is applied on the working strokes ordinarily. However, it is not essential that they move together and this mechanism is flexibly arranged so that a delay in one will not affect the others.

As in the above identified application an accumulator 11 is shown to which all the machines or heads are connected. This accumulator can be arranged like the one shown in the above identified application and is subjected to constant pressure of an elastic fluid through a pipe 14. The pressure in the small cylinder of the accumulator is provided by a rotary pump 15 taking oil or other liquid from a tank 16 and operating constantly. The oil is introduced into the accumulator 11 through a pipe 17. As the pump 15 operates constantly, it supplies the accumulator with the liquid under pressure which is fed to the various cylinders of the units and supplies all of them. Through a pipe 20 the oil is pumped into a pressure manifold 21 which acts to receive it and discharge it to the various points from which it is to pass. It is supplied to the cylinders 50 which reciprocate the drills through pipes 22. The return pipes 23 from the cylinders 50 which operate the drills lead back into a second reservoir 24 which drains directly into the tank 16. The reservoirs 21 and 24 of course are entirely separate and all the return drains deliver into the reservoir 24 while all the power lines or pipes receive liquid under pressure from the reservoir 21. The low pressure side of each cylinder 50 operating one of the several machines is connected by a pipe 25, through which the oil passes first in one direction and then in the other, with a valve casing 40 as shown in the above identified application.

The pipes 22 and 23 enter the valve casing 40. Into this casing extends a valve stem 41 having two valves 42 and 43 thereon located at all times on opposite sides of the port in the valve casing which communicates with the inlet pipe 22. On one side of this port and spaced from it a distance equal to the length of the piston valve 42 is a port communicating with a pipe or passage 44 which extends to a second valve casing 45. This valve casing has in it a double piston valve 46 pressed by a spring 47 and its motion backward limited by a pin 48 as usual. This piston valve controls the pipe or passage 44 and the main inlet pipe or passage 49 to the high pressure side of a cylinder 50. In this cylinder is a piston 51 operating a piston rod 52 on which, or connected with which, is the drill head 9. All these machines, of course, are constructed alike.

From the other or low pressure side of the cylinder 50 a pipe 54 communicates with the valve casing 45 at one extreme end. Also from the extreme end of the low pressure side of the cylinder 50 extends a pipe 25 which has been mentioned and through which the oil passes first in one direction and then the other constituting the exhaust. This pipe enters the casing 40 at a point to be controlled by the piston valve 43 and will allow the exhaust low pressure oil to flow into the pipe 26 when the parts are in the position shown in Fig. 22. There is a by-pass 55 controlled by an adjustable needle valve 56 which is closed and opened by the valve 43. There is also a pipe or passage 57 entering the spring chamber behind the valve 46 and having two entrances to the valve casing 40 spaced apart as shown. The pipe 23 is connected with the casing 40 at the extreme left end so as to communicate with the passage 44 only in the reverse position.

Connected with the piston rod 52 is a cam plate 60 reciprocating with it. This cam plate in the form shown has a simple set of cams thereon comprising a slow feed or cutting stroke cam 61, a stopping cam 62 and a reverse cam 63.

Mounted on a stationary shaft 65 is a bell crank 66 having a roll for engaging said cams. The other end of the bell crank is connected with the valve rod 41 pivotally. The motion of the bell crank in a certain direction is resisted by a plunger 67 which is moved outwardly by a spring 68 and is supplied with pressure fluid through a pipe 69 to move it against a projection on one arm of the bell crank 66 for starting from neutral, as shown in Fig. 22. For reversing a pipe 38 supplies a similar plunger at the other end of the spring 68. There is also a spring pressed plunger 70 having a V-point 71 for engaging a similar point on the bell crank, forcing the bell crank out of neutral position so that it will always be moved toward one of the cams 61 or 62. Thus means is provided for operating each tool automatically through a complete cycle of operations, and then stopping all of them, but not necessarily simultaneously, as described in the above identified application. To insure operation on reversing a fourth cam 59 is located to engage a spring pressed plunger 58 on the arm 66 and force the V-point on the arm past the V-point 71 on reversing.

In Figs. 2 to 8 inclusive is shown a hand operated valve 27 for starting and controlling the flow of liquid to the indexing device. This valve has an operating handle 28 and is adapted to be turned to three positions. In the stop position shown in Figs. 2, 3, 4, 5 and 6 the valve cuts off the pressure. In this position the drain pipe 30 is open, being connected with both the pipes 18 and 29. In the operating position shown in Fig. 7 the valve is turned so that it connects the pressure pipe 19 with the starting pipe 18. In the position shown in Fig. 8 the valve connects the pressure pipe with the reverse pipe 29.

As shown in the figures just above mentioned the handle 28 is mounted on a valve stem 31 which is provided with coil springs 32, the ends of which extend substantially radially and engage a stationary pin 33. The handle 28 also has a pin 34 which extends down in between the two ends of the coil springs 32. When the handle is turned away from the neutral or stopping position illustrated, pressure of one spring is brought to bear on it to swing it back so it has to be held in the starting or reversing position long enough for either of these operations to start. The valve 27 itself is fixed to the shaft 31 as indicated. The shaft or rod 31 passes through a casing 35 which is provided in a recess thereon with two vertical pins 36 each freely mounted to move up and down and having a handle 37 extending out through the wall of the casing for operating it.

When the handle 28 and valve are turned either to the running or reversing position, the corresponding ends of the springs 32 passes the position of the stop pin 36 on that side. If it is desired to keep the machine running the handle 37 and pin 36 are then raised, as shown in dotted lines in Fig. 5. It comes in front of the end of the spring 32 and holds the valve in that position until that pin 36 is lowered again. Then the valve will be swung back by the spring to neutral position.

The pipe 18 when opened to the pressure by the valve 27, introduces the oil under a plunger 72 into a valve casing 73. This pressure, therefore acts to hold up the plunger 72, in which position this valve is closed and any oil in the pipe 74 extending therefrom will drain out through a pipe 75, as shown in Fig. 9, and into the drain reservoir 24.

The stem of the plunger 72 is guided in a casing 76 closed by a cap 77 and is pressed up by the pressure in the pipe 18 to engage a pin 78 on a pivoted arm 64. This arm is pivoted in a position so that the pin 78 will be acted on by a cam 79 on the head 9. When this head moves to the extreme rear end of its stroke, the plunger will be forced down thereby. This changes the position to that shown in Fig. 10 and the supply pipe 18 then delivers into the pipe 74. This, of course, occurs only when the tool is properly positioned at the rear end of its stroke and if it is not so positioned, as shown in Fig. 9, the pressure will be cut off by this valve 72.

The pipe 74 then becomes a pressure pipe when the valve 73 is opened, and it enters a valve 80 exactly like the valve 73 and operates in the same way controlled by the position of the head on the other side to admit pressure from the pipe 74 to a pipe 81. The drain when the valve 80 is closed goes back through a pipe 82.

It will be seen, therefore, that the pressure will get into the pipe 81 only in case both of the two heads are drawn back to their full distance. Whenever either one of them is forward the pressure cannot pass through the two valves 73 and 80.

Figure 19:
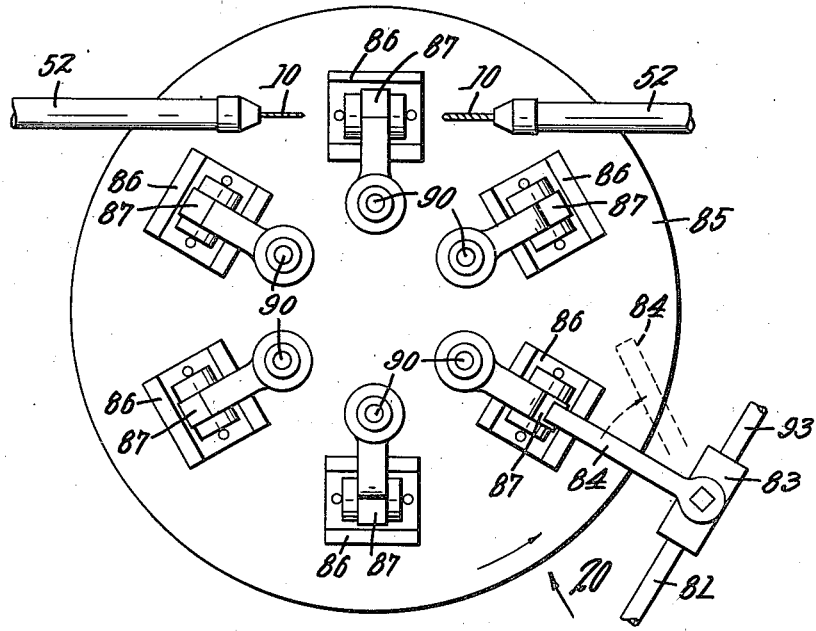
Fig. 19 is a plan of the work table.
Figure 20:
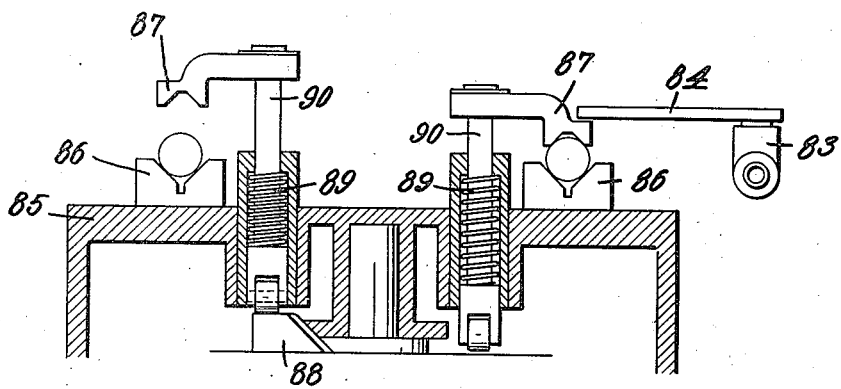
Fig. 20 is a view, taken in the direction of the arrow 20 in Fig. 19.

The pipe 81 delivers the pressure to a normally open valve 83 which is provided with an operating handle 84. This valve is normally open and is shown so in Fig. 19. When the arm 84 is turned to the dotted line position the valve is closed and oil cannot circulate. This is done automatically as will appear whenever the work is not properly positioned in the work holders. The work is mounted on a rotary table 85 which is indexed around, when the valve 83 is open, in a manner that will appear later. On this table are work rests 86 for the work and corresponding jaws 87 for clamping the work in position. These jaws are operated by a cam 88 which is stationary and engages the lower end of a rod 90 to move the rod up. A spring 89 moves the rod 90 down and supplies the pressure to hold the work down in the rest 86. As the table 85 turns, it opens the jaw in the position shown at the left in Fig. 20 so that the work can be loaded in position. Then the cam 88 allows the rod 90 to move down into the clamped position.

The arm 84 is located just above the path of the several jaws 87 so that when they are clamped down into proper position they pass under it and do not disturb it as the table rotates. If for any reason the work is placed in the jaws in skewed position or if anything gets between the work and the jaws so that the upper jaw is held up slightly after it passes the loading position, it will come into contact with the arm 84 and close the valve 83. This, as will appear, stops the rotation of the table 85.

When the valve 83 is open the oil flows through it into a pipe 93. The pressure is exerted against a spring pressed plunger 94 and moves it in against the resistance of the spring. This plunger has rack teeth on its surface meshing with a gear segment 95 on a cylinder 96. Therefore the cylinder is turned automatically through a definite part of a revolution when the valves 73, 80 and 83 are all open. The cylinder 96 has two teeth 97. As this cylinder is spring pressed, it acts as a ratchet with a tooth 98 on the bottom of a valve 99. This valve and the parts of the indexing device described below are not claimed herein, by themselves as they constitute part of my prior application, Serial No. 375,778, filed July 13, 1929. It is to be noted however, that this device is automatic instead of being started by hand.

The device is run by a small motor 113 comprising two gears 140 and 141, the gear 140 being connected with the valve 99 by the ratchet arrangement which has been described. The oil enters through the port 142 and when the motor has rotated half a revolution exhausted through the port 143.

Operating liquid, as for example oil, is introduced through an inlet 117 and discharged through an outlet 118. The bottom of the motor shaft 115 operates the valve 99 having passages 109 and 108 connected with the two ports 117 and 118 for controlling the same. By opening this valve the motor is turned through half a revolution and then stops automatically. The valve is turned by the motor through pins and projections to open the exhaust. The valve is now turned half way around from its original position and the port 117 closed.

The motor shaft 115 is provided with a sector cam 130 which is provided with two rolls 123 diametrically opposite, the sector cam being located positively on the shaft 115. The two rolls are arranged to engage in alternation the grooves of a Geneva wheel 124.

Figure 14:
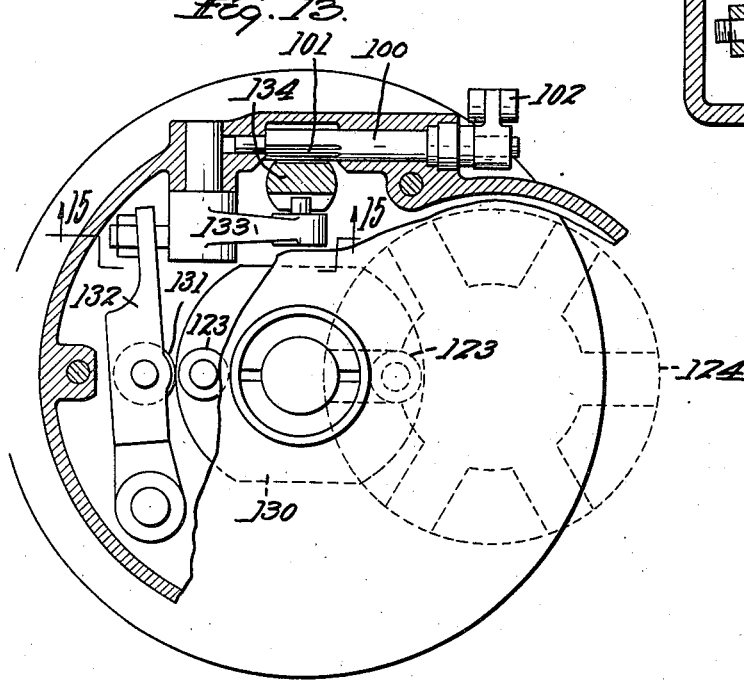
Fig. 14 is a sectional view of the indexing mechanism on the line 14—14 of Fig. 11.

As constructed this Geneva wheel has radial grooves and consequently one roll 123 will rotate the Geneva wheel throughout an arc of 60° and then the rolls 123 come into the at rest position 90° displaced from the position indicated in Fig. 14. This, as stated, causes two operations per revolution of the shaft 115 instead of one. The Geneva wheel is mounted on a shaft 125 which is geared by replaceable gears 126 and 127 to the shaft 111. These gears 126 and 127 can be taken off and replaced very easily by an ordinary arrangement as will be seen. Thus the indexing speed can be changed merely by changing these gears without interfering with the rest of the mechanism.

The sector cam 130 has a circular part most of the way around and two flat sides. While the machine is operating the flat part of the cam moves outwardly a roll 131 on a lever 132. This actuates a bell crank 133 and holds a locking plug 134 down, thus keeping the plug out of the registering recess 136 in the bottom of the table 85.

When the machine stops the flat part of the cam comes to rest in a position to allow the bell crank to move back and the plug to be moved into the recess and lock the index wheel, all as in my application No. 375,778.

The locking plug 134 is provided with a rack on one side which oscillates a shaft 100 through gear teeth 101 thereon. Thus an arm 102 fixed on the shaft 100 is turned up to the position shown in Fig. 17 when the plug 134 is withdrawn to free the table 85. When the table is locked the arm 102 is forced down from the position shown in Fig. 17. On the end of the arm 102 is pivotally suspended a push rod 103 always pulled forward by a spring 104. The push rod 103 thus forces down a valve stem 119 and its valve 120. This lets the pressure through from a pipe 121 to a pipe 122 and the pipes 69. Thus the plunger will start forward from neutral position.

Oil under pressure is conducted through a pipe 128 from one of the pipes 69 to admit pressure to a valve casing 145. The oil leaks by an adjustable needle valve 146 and passage 147 to lift a piston 148 against spring pressure. The rod 149 on this piston lifts a latch 150 against the action of a spring 151. The lever 150 is pivoted on a stud 154 which constitutes a stop and guide for the rod 103. The other end of the latch 150 acts as a lock, which, previously, by the action of the spring 151 has swung down over the end of the rod 119 to lock the valve 120 in open position against the oil pressure under it coming from the pipe 121. Now the valve is released and the valve 120 closes. The compression of the spring over the piston 148 creates more pressure than the light spring under a check valve 152 and the oil passes back into the pipe 128 freely through the large port 153 letting the stem 149 drop back, the oil pressure in said pipe 128 now having been relieved. Meantime the table 85 has been locked again by the plug 134 and the shaft 100 has turned to raise the rod 103 and all the parts are left in the position shown in Fig. 17. The pistons 51 move forward and back and stop.

When lowered a pin 114 on the rod 103 rests on an arm 105 pivoted on a bracket fixed to the frame. The free end of this arm 105 is connected with a vertical rod 106. This rod constitutes the stem of a single acting small plunger 110 located in a cylinder 112. This cylinder under the plunger is connected by a pipe 39 with the reversing pipe 29.

By means of a hand operated valve 138 the pressure can at any time be directed through a pipe 139 into the pipe 122 when the valve 120 is closed. This furnishes another way of starting the drills forward, without indexing the work table, for trial and adjustment.

In operation the oil is pumped under pressure into the pressure manifold 21 and from there through the pipes 22 passes to the several cylinders 50 and operates the same substantially in accordance with the above mentioned application, Serial No. 357,532. In the present case, however, instead of operating constantly the pistons make a complete reciprocation and, when they come back to the most retracted position, stop. The drills or other tools are constantly in rotation, however.

Now the starting valve 27 is turned to bring the pressure from the feed pipe 19 into the pipe 18. If either one of the heads 9 is not all the way back either the valve 73 or the valve 80 will stop the flow of the oil beyond that point. If they are both all the way back the oil will flow as far as the valve 83. The work is being loaded on the intermittently rotating table 85 and if when it gets to the angular position shown in Fig. 19 the work is not accurately and fully centered under the jaw 87 that jaw will engage the handle 84 and shut the valve 83 thus stopping the flow of oil beyond that point. If, however, the work is properly centered and there is no obstruction the table will continue to rotate beyond that point and the oil will flow from the pipe 18 through the pipes 74 and 81 and the pipe 93 to the piston 94 and operate the valve 99 half a revolution. The effect of this is to bring the valve into position for the pressure from the pipe 117 to pass into the gear motor 140—141. This rotates the table in the manner shown and described in the above mentioned application, Serial No. 375,778. The table 85 is caused thereby to rotate intermittently.

Figure 16:
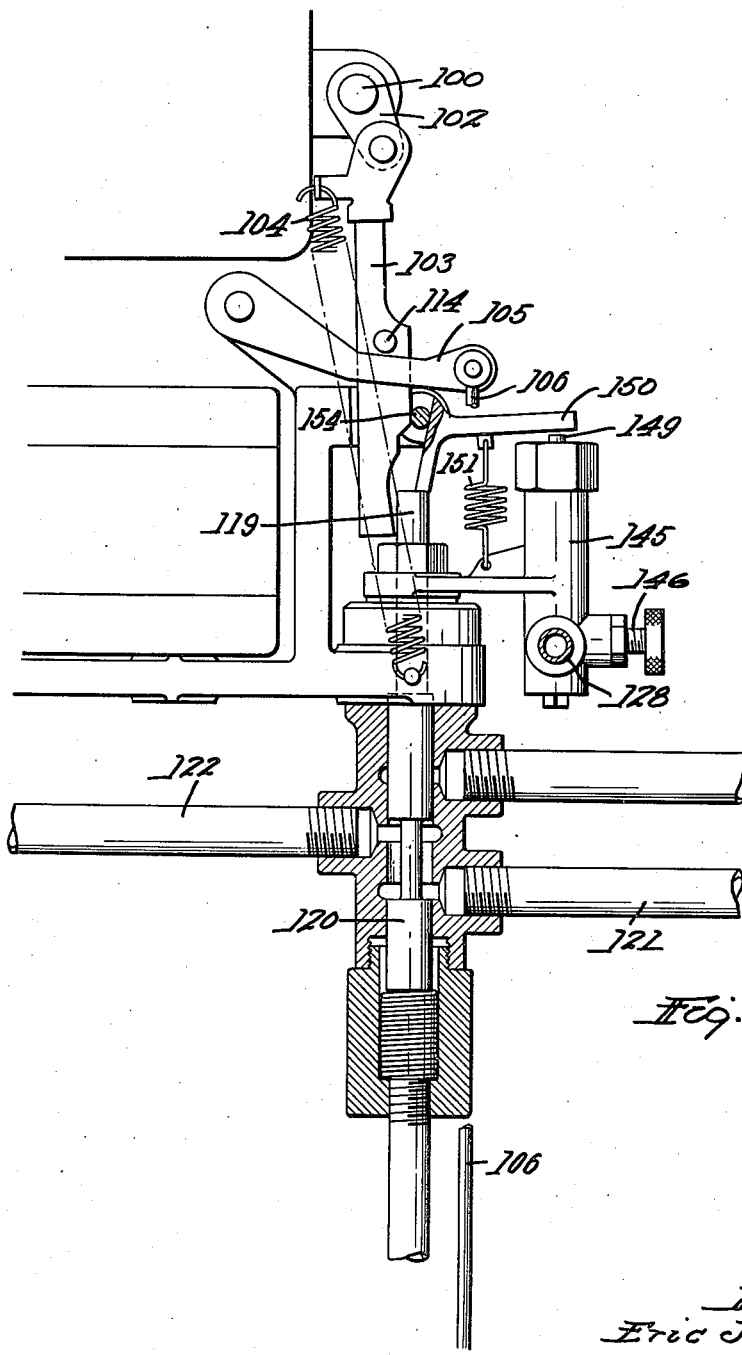
Fig. 16 is a sectional view of another valve which is associated with the indexing mechanism showing the parts in operating or starting position.

Means is shown for locking the table in fixed position between each two motions as indicated in the last named application. Furthermore means is shown herein for connecting the locking means with the controlling device so that when the table is unlocked the shaft 100 turns to the position shown in Fig. 17 and the valve 120 rises and closes so that no pressure is conducted through the pipe 122. However, when the locking plug 134 is raised and slips into the recess 136 these parts come to the position shown in Fig. 16, the valve 120 descends and opens and the pressure is admitted into the pipe 122. This pressure goes through the pipes 69, into the system shown in Figs. 21 and 22. Now the table being locked the drills or other tools are advanced by this mechanism and the desired operations take place and these tools are retracted to their original neutral position automatically and then stop.

The pressure in the pipe 122 also goes through the pipe 128 to raise the piston 148 and its stem 149 so as to release the valve 120 by means of the latch 150 whereupon this valve closes and further flow of the oil through the pipe 122 is stopped.

As stated if it is desired to reverse the mechanism and bring it back to starting point after it has got started the valve 27 is turned to the reversing position, in which case the oil causes the plunger 110 to rise and lift the push bar 103 and, wherever the shaft 100 is, it will turn it up to the position shown in Fig. 17 which unlocks the table if it happens to be locked at the time.

It will be seen therefore that the machine is fully automatic after being started by the valve 27 but that it can be stopped by turning this valve to reversing position by hand. It will be seen also that if the work heads are not all retracted to their neutral position or if the work is not properly placed the table will be stopped before the next piece of work gets to drilling position and that the indexing will cease at that time.

Although I have illustrated and described only one form of the invention I am aware of the fact that modifications can be made therein by any person skilled in the art without departing from the scope of the invention as expressed in the claims. Therefore I do not wish to be limited in this respect but what I do claim is:—

1. In a device for operating a machine tool, the combination with a tool head mounted to reciprocate, hydraulic means for moving the tool head forwardly to perform the work and withdrawing it automatically to its extreme retracted position, a feed pipe connected with a source of fluid under pressure, a hand-operated starting valve connected to said feed pipe, and a second pipe leading from the valve and adapted to be opened and closed thereby, of a work table, means for moving the work table to place the work in operative position, and a system of piping connected with the first named pipe through which pressure is applied to said work table moving means to actuate the table, means including a hydraulically-operated valve under conjoint control of said starting valve and said tool head for effecting the actuation of said hydraulic means to reciprocate said tool head, a second valve in the pipe system which is in series with said starting valve and is normally closed, but adapted to be opened by the movement of the tool head to its extreme retracted position to effect the operation of said table moving means.

2. In a device for operating a machine tool, the combination with a tool head mounted to reciprocate, hydraulic means for operating the tool head, a feed pipe connected with a source of fluid under pressure, a hand-operated starting valve connected to said feed pipe, and a second pipe leading from the valve and adapted to be opened and closed thereby, of a work table, means operatively connected with the second pipe for moving the work table to place the work in operative position, a shaft connected with the valve, a spring connected with the shaft and having two ends projecting therefrom, a stationary pin between the two ends of the spring, a handle on the valve fixed to said shaft and having a pin projecting between the two ends of the spring, whereby the spring normally holds the valve in neutral position and yieldingly returns it thereto when free to do so, and a slidable pin at the side of the other pins adapted to be projected behind the end of the spring, when it is moved far enough out of neutral position to hold the valve in that position, whereby when the reciprocable pin is drawn back out of the path of the spring the valve will be returned to neutral position.

3. In a hydraulic operating means for machine tools and the like, the combination with a reciprocable tool head and automatic means for operating the tool head, said tool head having a cam thereon, of means for conducting fluid under pressure, a valve to which said means is connected, the valve being provided with means whereby the pressure of the fluid will normally keep it closed, and means operated by the cam for opening the valve upon withdrawal of the head to its extreme neutral position, of a movable work table, means adapted to be operated upon the opening of said valve by the pressure of the fluid for advancing the work table a step to bring a piece of work into position for the tool to operate thereon, a work rest on the table, a jaw, means for moving the jaw in a position to engage the work on the rest and hold the jaw closed, a valve connected with the first named valve, and a handle on the second valve in position to be moved by said jaw to close said second valve whenever the jaw is held in an abnormal position either by the misplacement of the work therein or the presence of a foreign body.

4. In a machine tool, the combination with a reciprocable tool head, of a rotary table carrying the work, hydraulically-operated means for rotating said table, work rests on said table, a corresponding series of jaws for clamping the work against each work rest, means connected with each jaw for holding the jaw down on the work, a valve for controlling the supply of fluid pressure to said rotating means to index the work table around to bring the work into operative position, and means automatically operated by a jaw, in a displaced position thereof, for operating said valve for stopping the indexing of the table if the work is not accurately located in the work rests and jaws.

5. In a machine tool, the combination with a reciprocable tool head, of a rotary table carrying the work, means for rotating said table, work rests on said table, a corresponding series of jaws for clamping the work against each work rest, means connected with each jaw for holding the jaw down on the work, a valve for controlling the supply of fluid pressure to said rotating means to index the work table around to bring the work into operative position, said valve having a handle located normally to project over the jaws as they pass around or to be engaged by any of said jaws which may be located out of position due to any misplacement of the work or the like, whereby the handle will be turned, the valve being located in such position as to be closed by the turning of the handle, thereby stopping the indexing of the table until the work is properly placed in position.

6. In a metal working machine, the combination with metal working tool holders, of a work table, means on the work table for supporting the work, means for indexing the work table around to present the different pieces of work in position to be operated on by the tools in proper sequence, a system of piping connected with a source of fluid under pressure, a valve in said piping normally open and arranged to be closed by the rotation of the table with a piece of work therein improperly set, a spring-pressed piston at the end of the pressure piping system, said piston having a rack, an oscillatable member having gear teeth thereon meshing with the rack, whereby, when the pressure is on, the piston will be moved inwardly and the cylinder turned in one direction, a valve, a ratchet mechanism connected with said cylinder for operating the valve to turn it intermittently as the cylinder is oscillated, a motor for rotating the table intermittently and means connected with said valve for controlling admission of fluid under pressure to the motor.

7. In a machine tool, the combination with a series of tool heads and means for operating them, of a rotary work table, means connected with a source of fluid pressure for rotating the table through a part of a revolution whenever fluid pressure is admitted throughout the piping system, a plug adapted to be moved into a recess in the table for locking the table in stationary position during the operation of the work, a bell crank connected with the plug for operating it after each motion of the table, a rack on the plug, a shaft having gear teeth thereon meshing with the rack, whereby the shaft will turn to two positions in accordance with the position of the plug, an arm on the shaft, a push rod depending from said arm, and a valve controlling the admission of fluid under pressure for operating the tool heads, said push rod being in position to move said valve into a position to open it and allow the pressure to pass through, whereby only when the plug is in position to lock the table will the tools be capable of operation.

8. In a device for controlling the operation of a machine tool, the combination with an intermittently rotatable work table, a tool head, hydraulic means for operating the tool head, a system of piping, a valve in said piping for turning the pressure on and off to control the operation of the tool head, yielding means for normally moving the valve to closed position to shut off the pressure, said valve having a projecting rod, means connected with the operating means of the table for automatically locking the table after it has completed a definite portion of a revolution to bring the work thereon into registration with the tool, a shaft connected with said locking means to be oscillated thereby, an arm on the shaft, a push rod depending from said arm, a guide for the push rod, yielding means for holding the push rod in contact with the guide, and means in position for engaging the end of said valve rod and push it in when the arm is moved by the unlocking of the table to positively close said valve and prevent the operation of the tool head when the table is operating.

9. In a control device for a machine tool, the combination with a tool head, hydraulic means for operating the tool head, an intermittently movable work supporting table, hydraulic means for moving the table, and a valve between a source of pressure and the means for operating the tool head to turn the pressure on and off, of a push rod adapted to move against the stem of the valve to open the valve when the table is locked in position and thus allow the pressure to operate the tool operating means, a stationary guide for said push rod, the push rod having a shape to cause it to engage the valve rod as it moves in and to be pushed away from it and pass over its edge when it reaches a position in which the valve is fully open, and a pivoted latch adapted to move into a position to engage the end of the valve rod and hold the valve open until the latch is dislodged.

10. In a control device for a machine tool, the combination with a tool head, hydraulic means for operating the tool head, an intermittently movable work supporting table, hydraulic means for indexing the table, a valve connected from a source of pressure to the means for operating the tool head so as to turn the pressure on and off, and means for locking the table, of a push rod connected with said locking means to move against the stem of the valve to open the valve when the table is locked in position and thus allow the pressure to operate the tool operating means, a pivoted latch adapted to move into a position to engage the end of the valve rod and hold the valve open until the latch is dislodged, said latch having an arm projecting therefrom, a valve casing having a piston therein, a rod projecting through the valve casing in position to move said arm and release the latch, said valve casing beyond the piston being connected with a source of pressure through the first named valve, whereby, when said valve is open, the source of pressure will tend to move the piston in the valve casing, a restricted passage in said valve casing leading to the piston, whereby the action of the piston will be delayed, and means whereby, when the piston is moved to release the latch and the main valve is closed again, the casing is quickly relieved of pressure.

11. In a machine tool operating and controlling device, the combination with means for supplying constantly a liquid under pressure, of a hand-operating starting valve, a system of piping controlled by said valve, a work table adapted to be operated in accordance with the connection of said system of piping with the source of pressure, a tool head, hydraulic means operated by liquid under pressure for reciprocating the tool head, a reverse pipe connected with said valve to be opened to the source of pressure, means connected with the reverse pipe for stopping the tool head at any stage of its operation and returning it to neutral position, a piston and cylinder connected with said reverse pipe and means whereby, when the piston is moved by the introduction of liquid under pressure through the reverse pipe, the means for closing the said valve will be released in whatever position the same may be and the table will be locked in stationary position.

12. In a machine tool operating and controlling device, the combination with means for supplying constantly a liquid under pressure, of a hand-operated starting valve, a system of piping controlled by said valve, a work table adapted to be operated in accordance with the connection of said system of piping with the source of pressure, a tool head, hydraulic means operated by liquid under pressure for reciprocating the tool head, a reverse pipe connected with said valve to be opened to the source of pressure, means connected with the reverse pipe for stopping the tool head at any stage of its operation and returning it to neutral position, a valve in the hydraulic system, a table locking device, means operated by the table locking device for closing the said valve, said valve being connected with the hydraulic means for operating the tool head to stop and start the same in accordance with the position of the valve, a piston and cylinder connected with said reverse pipe, and means whereby, when the piston is moved by the introduction of liquid under pressure through the reverse pipe, the means for closing the said valve will be released in whatever position the same may be and the table will be locked in stationary position.

13. In a hydraulic device for operating a machine tool or the like, the combination with means for circulating a liquid under pressure constantly, and a pressure manifold to which the pressure liquid is delivered, of a tool head, hydraulic means for reciprocating the tool head, a pipe connected from said pressure manifold to said hydraulic means, a drain receiving return reservoir, a return pipe from the hydraulic means to the return reservoir, a feed pipe extending from the pressure manifold, a hand-operated valve for controlling the feed pipe, a system of piping extending from said valve, an indexing table for supporting the work, means connected with said system of piping for controlling the operation of the table, means whereby when the table is moved, the tool head cannot operate, means whereby when the tool head is operating the table cannot operate, and pipes for draining the various hydraulic elements back into said return reservoir.

In testimony whereof I have hereunto affixed my signature.

ERIC J. HIRVONEN.